Figure 1:
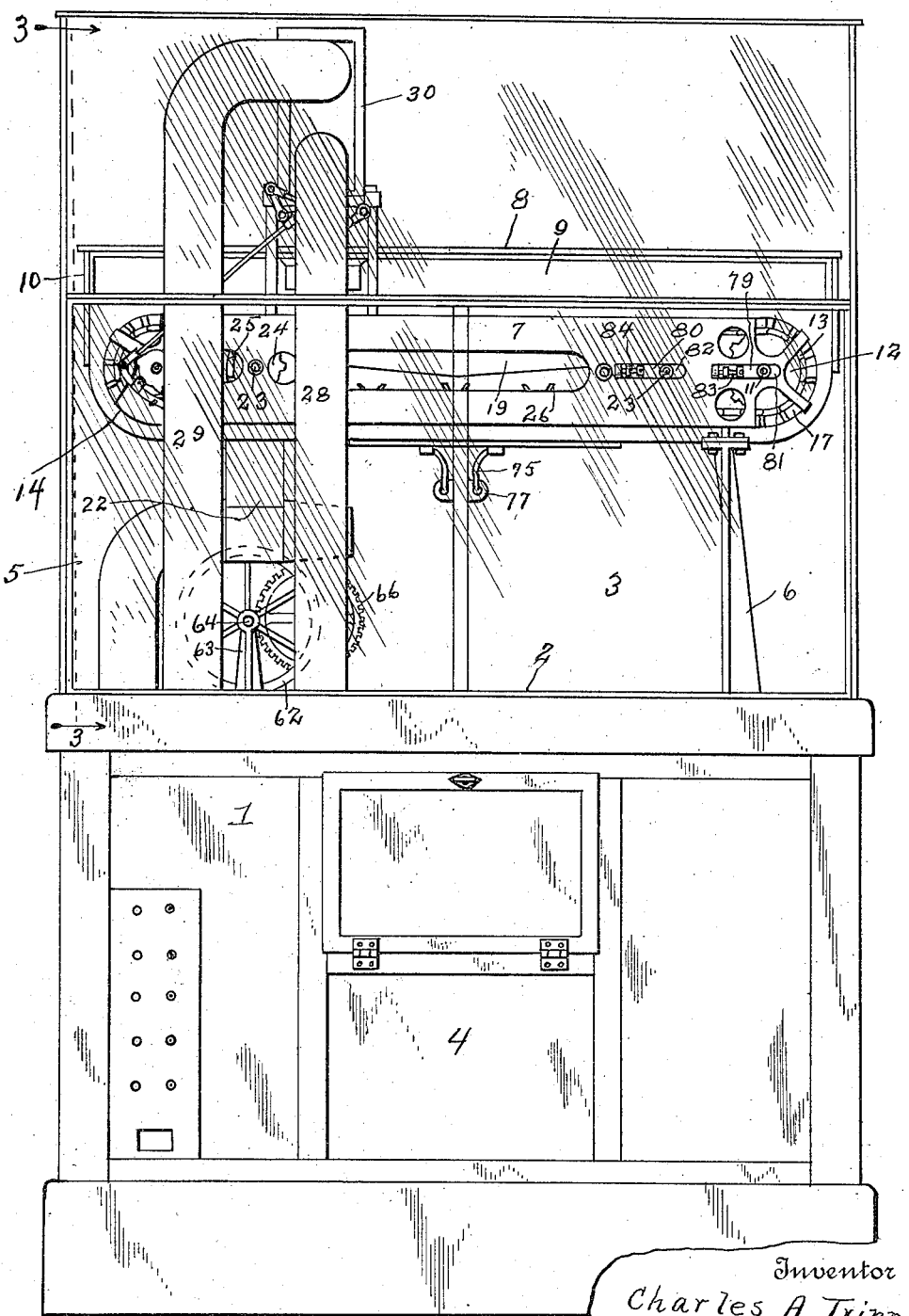

C. A. TRIPP.
MACHINE FOR ROASTING PEANUTS AND THE LIKE.
APPLICATION FILED OCT. 19, 1917.

1,295,939.

Patented Mar. 4, 1919.
6 SHEETS—SHEET 1.

Inventor
Charles A. Tripp
By
Lockwood & Lockwood
Attorneys

C. A. TRIPP.
MACHINE FOR ROASTING PEANUTS AND THE LIKE.
APPLICATION FILED OCT. 19, 1917.

1,295,939.

Patented Mar. 4, 1919.
6 SHEETS—SHEET 2.

Inventor
Charles A. Tripp
By Lockwood & Lockwood
Attorney

C. A. TRIPP.
MACHINE FOR ROASTING PEANUTS AND THE LIKE.
APPLICATION FILED OCT. 19, 1917.
1,295,939.
Patented Mar. 4, 1919.
6 SHEETS—SHEET 3.
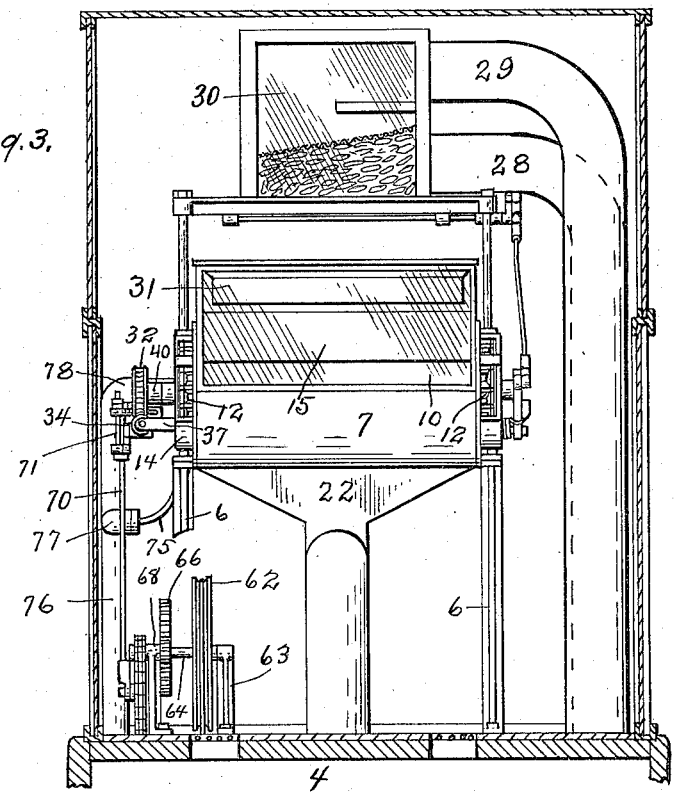
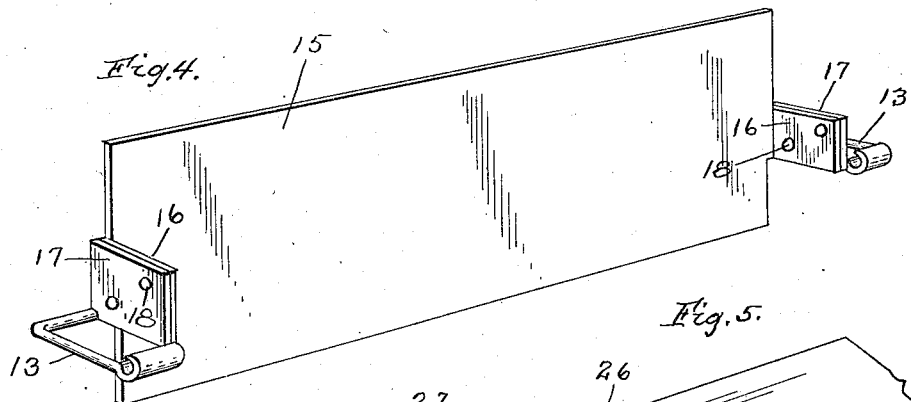
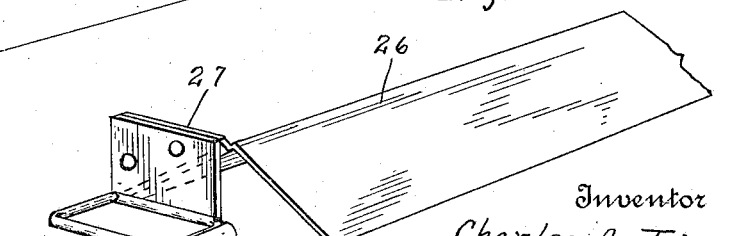
Inventor
Charles A. Tripp.
Attorneys

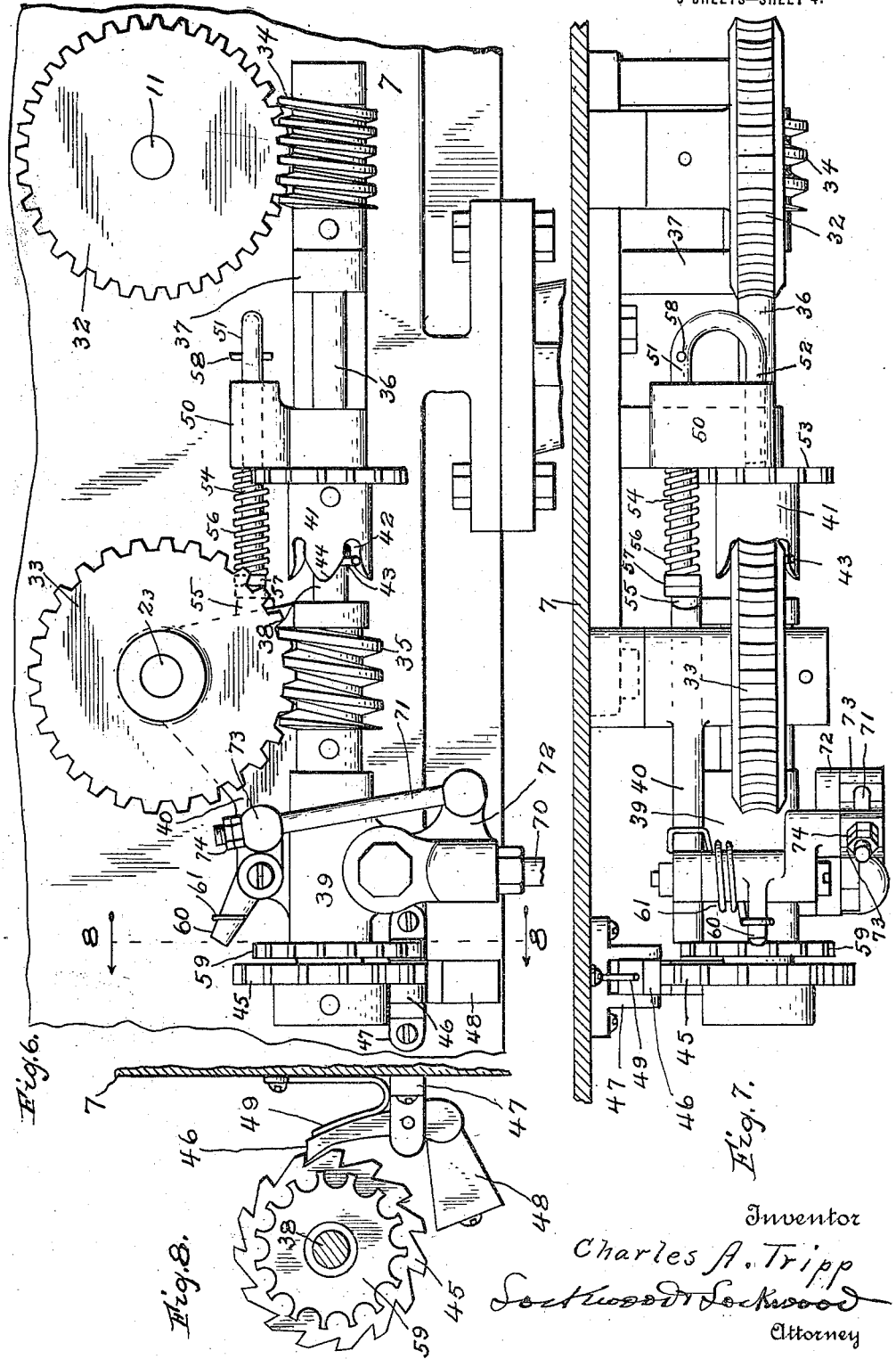

C. A. TRIPP.
MACHINE FOR ROASTING PEANUTS AND THE LIKE.
APPLICATION FILED OCT. 19, 1917.

1,295,939.

Patented Mar. 4, 1919.
6 SHEETS—SHEET 5.

Inventor
Charles A. Tripp
By
Lockwood & Lockwood
Attorney

C. A. TRIPP.
MACHINE FOR ROASTING PEANUTS AND THE LIKE.
APPLICATION FILED OCT. 19, 1917.
1,295,939.
Patented Mar. 4, 1919.
6 SHEETS—SHEET 6.
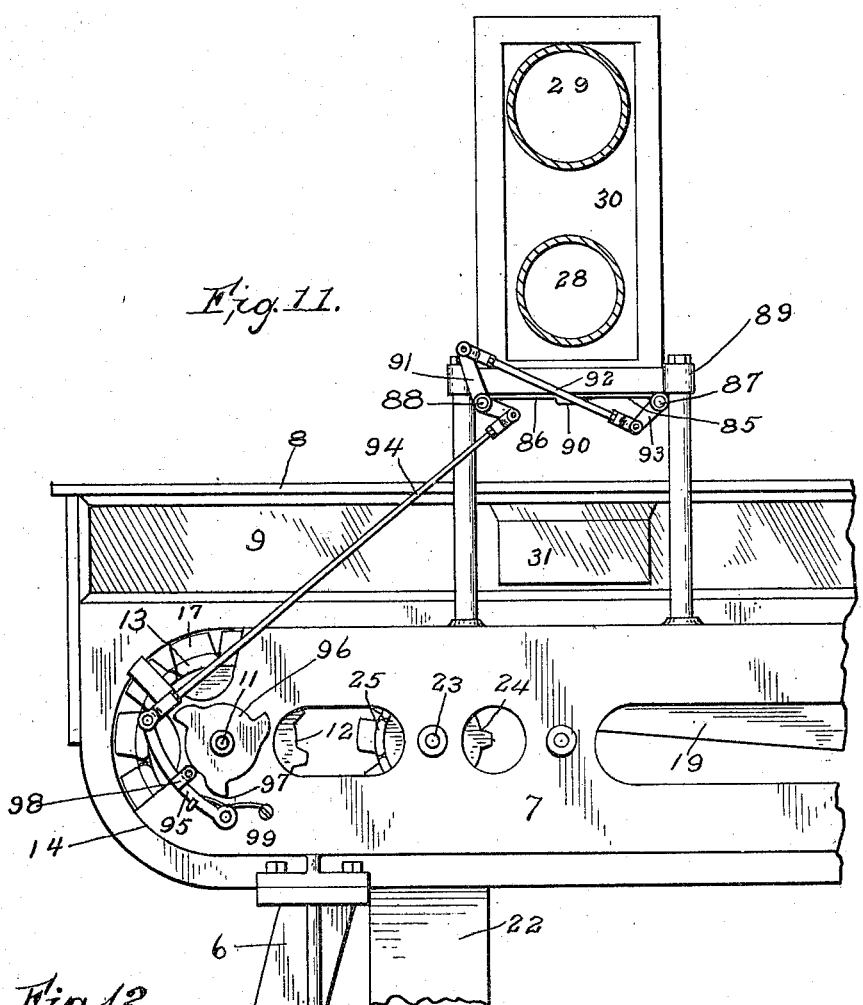
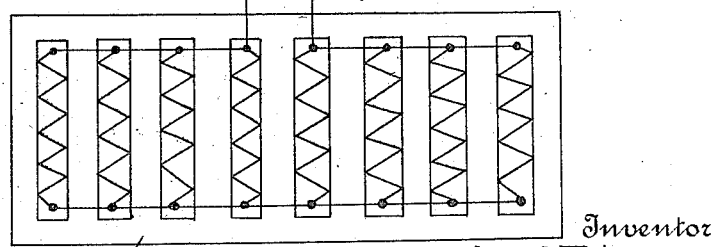
Inventor
Charles A. Tripp
By Lockwood & Lockwood
Attorneys

UNITED STATES PATENT OFFICE.

CHARLES A. TRIPP, OF INDIANAPOLIS, INDIANA, ASSIGNOR TO HOLCOMB & HOKE MANUFACTURING COMPANY, OF INDIANAPOLIS, INDIANA, A CORPORATION.

MACHINE FOR ROASTING PEANUTS AND THE LIKE.

1,295,939.  Specification of Letters Patent.  Patented Mar. 4, 1919.

Application filed October 19, 1917. Serial No. 197,513.

*To all whom it may concern:*

Be it known that I, CHARLES A. TRIPP, a citizen of the United States, and a resident of Indianapolis, county of Marion, and State of Indiana, have invented a certain new and useful Machine for Roasting Peanuts and the like; and I do hereby declare that the following is a full, clear, and exact description thereof, reference being had to the accompanying drawings, in which like letters refer to like parts.

The object of this invention is to provide continuously operating mechanism for roasting or otherwise treating with heat, peanuts or other material. It is designed particularly with reference to use in connection with pneumatic means for feeding the peanuts or other material to the roasting or treating mechanism and also for removing or discharging the roasted or treated material from said mechanism. This pneumatic feeding and discharging means is partially herein disclosed, but more fully appears in a companion application filed of even date herewith.

One feature of the invention consists in combining with a plate an endless chain mechanism for carrying partition-like conveyer plates which travel on the surface of the hot plate. Two adjacent partition plates make a compartment into which one charge of the peanuts is introduced. As the partition plates move horizontally over the hot plate, they move this charge of peanuts along the surface of the hot plate and during that movement, the peanuts are roasted. This movement of the peanuts along the hot plate, of course, is very slow. After one compartment between two partition plates has been charged with peanuts and has been moved away from the charging position, the next compartment will receive a charge of peanuts. Therefore, there will be a number of filled compartments succeeding each other and traveling slowly over the face of the hot plate, whereby their contents will be roasted or otherwise treated.

Combined with said series of partition-like conveyer plates there is means for causing the movement thereof for successively moving the compartments under a charging chute to receive a charge of peanuts or the like.

Another feature of the invention consists in agitating means operating between each pair of partition-like conveyer plates while they travel over the hot plate, for stirring and agitating the peanuts on the hot plate. For this purpose said agitating bars must travel with the partition-like conveyer plates and have backward and forward movement independently thereof. They are preferably A-shaped bars with the two lower edges resting and sliding on the hot plate and as they are moved forward and backward on the hot plate, they are forced under the peanuts so as to separate them from the hot plate and agitate them. The agitating bars are transversely extending bars connected at their ends with endless conveyer chains which are parallel with the conveyer chains to which the partition-like conveyer plates are connected. They are also between said last-mentioned chains and are shorter than them. The means for actuating said chains which carry the agitating bars is so arranged as to cause temporary reverse movement thereof so that the bars move to and fro substantially for the width of the compartment between each pair of partition-like conveyer plates, while they are traveling over the hot plate. Also such driving mechanism is arranged to cause the agitating plates to travel along with the partition-like conveyer plates when they travel and keep between the corresponding pairs of conveyer plates until they have traveled beyond the end of the hot plate.

When the conveyer plates traveling along the hot plate reach the end thereof, they discharge the peanuts over the end of the hot plate. Another feature of the invention consists in means for further heating or treating the peanuts or the like after they have left said hot plate. They are discharged upon the lower wall of a housing surrounding said roasting or treating apparatus where they are engaged by said conveyer plates and caused to travel slowly and intermittently in a direction opposite to that in which they have traveled upon said hot plate. In this last journey of the peanuts, in the heating apparatus, they are further treated or roasted by a second hot plate located on the under side of said housing. The lower hot plate, however, does not heat the peanuts so highly as the upper and first-mentioned hot plate. No agitating bar, therefore, needs to be provided for stirring the peanuts on this lower plate excepting the partition-like conveyer plates which, of course, move and agitate them to some extent. If there is a considerable quantity of peanuts in the compartment the agitating bar on its lower and return movement will engage the upper peanuts in a compartment and to a greater or less extent agitate and stir the peanuts.

Another feature of the invention consists in providing an outlet at the end of said last-mentioned hot plate through which the peanuts descend by gravity into a blast pipe where they are blown out by a blast of air, said blast of air blowing the peanuts substantially horizontally toward the opposite side of the chamber in which the roasting mechanism is mounted.

There are other inventions and improvements in the means for carrying out the object of the invention as above outlined, which, however, will be fully understood from the accompanying drawings and the following description and claims.

Figure 2:
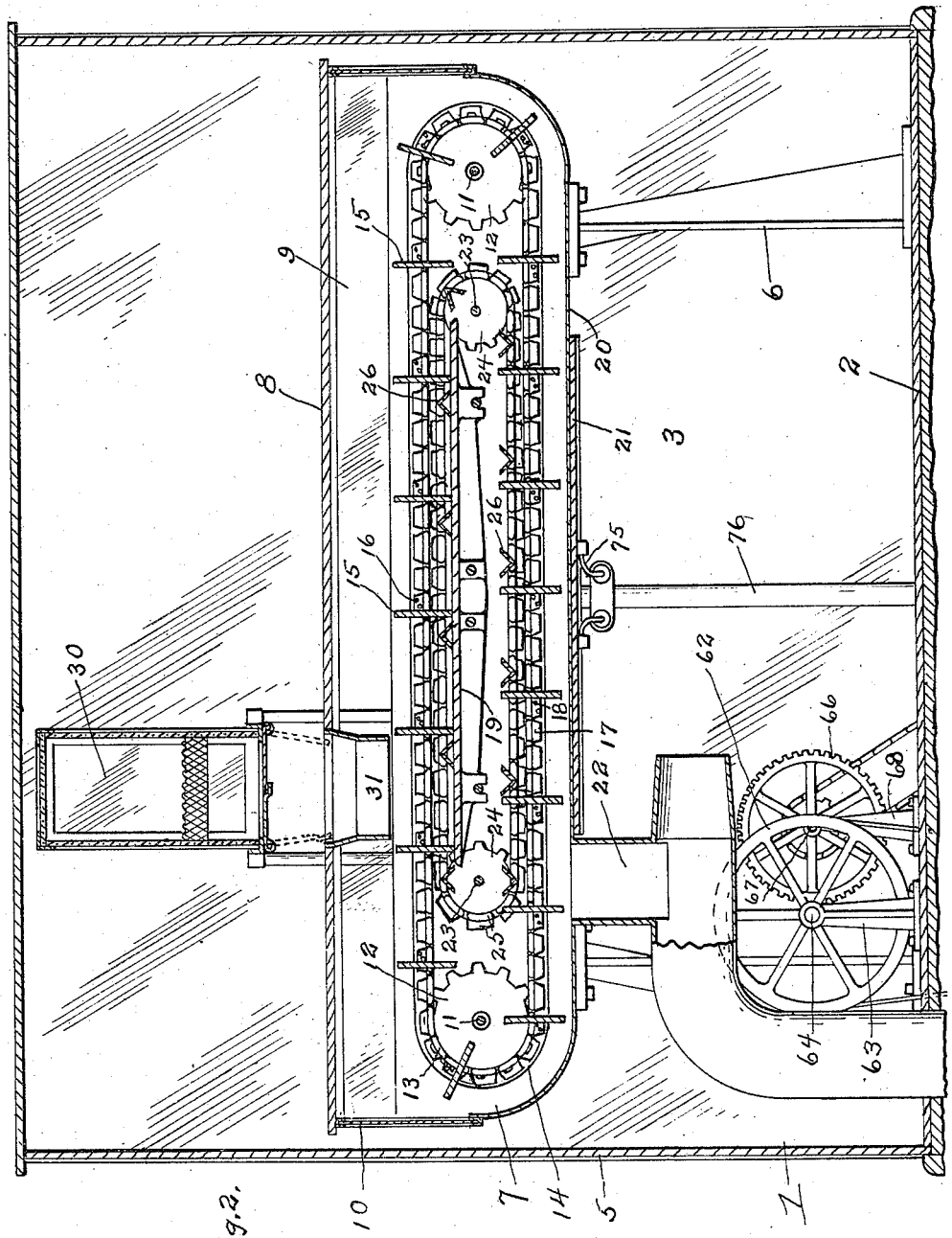
Figure 9:
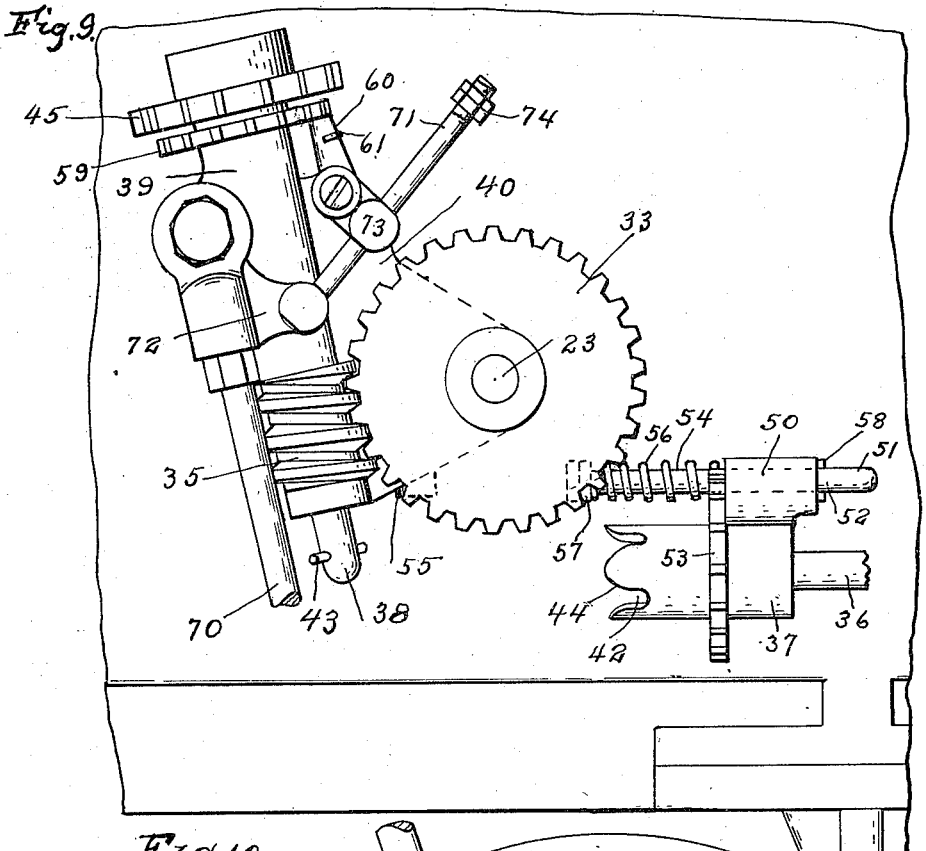
Figure 10:
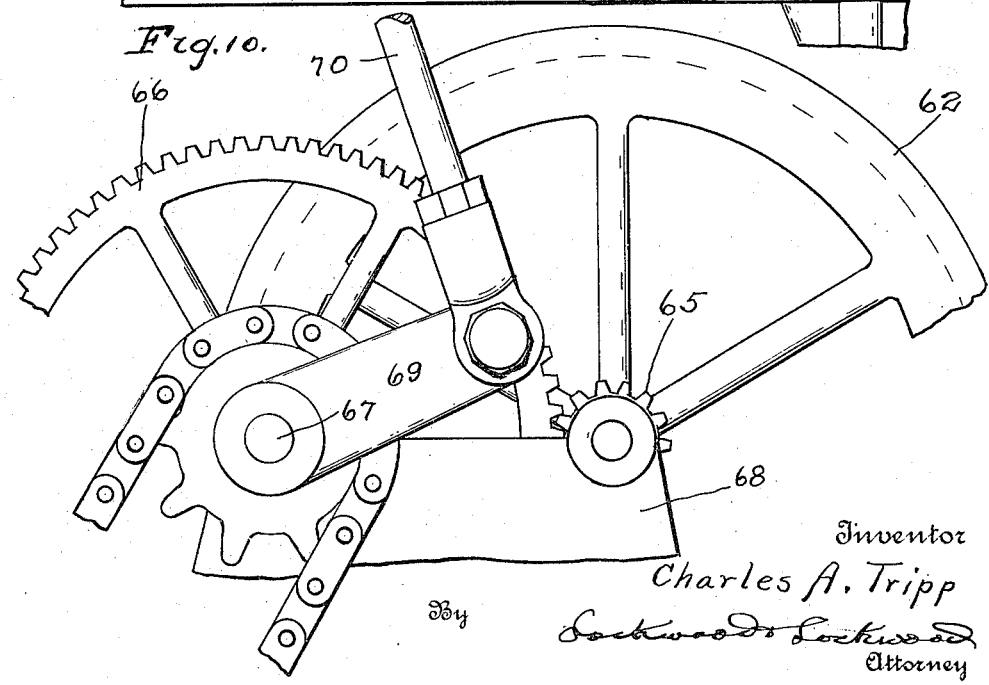

In the drawings, Figure 1 is a front elevation of the machine with the lower right-hand corner broken away. Fig. 2 is a substantially central vertical section through the upper half of the machine, the lower portion being broken away and parts being shown in dotted lines. Fig. 3 is a section on the line 3—3 of Fig. 1. Fig. 4 is a perspective view of a portion of the outer conveyer including one partition plate and associated parts. Fig. 5 is a perspective view of one of the bottom plates of the charging chamber, one end thereof being broken away. Fig. 6 is an elevation of the operating gears for controlling the movement of the conveyer plates and agitators. Fig. 7 is a top plan view thereof. Fig. 8 is a detailed sectional view on the line 8—8 of Fig. 6, showing the means for controlling the movement of the operating gears. Fig. 9 is a side elevation of one of the operating gears shown in Fig. 6, showing the position of parts when operated to move the agitating bars. Fig. 10 is a detailed elevation, showing the parts broken away, of the driving mechanism for operating the gears shown in Fig. 6. Fig. 11 is a detail side elevation of one end of the roasting device removed from the cabinet. Fig. 12 is a plan view of one of the heating elements removed from the roaster.

Referring to the drawings in which similar reference numerals designate corresponding parts throughout the several views, 1 indicates a cabinet which is preferably provided with a partition wall 2, which divides the cabinet into an upper and lower compartment 3 and 4, respectively, the walls 5 of the upper compartment being preferably constructed of glass or similar transparent material, while the walls of the lower compartment are preferably constructed of wood.

Mounted upon the partition wall 2 are standards 6, to the upper ends of which is secured a casing 7, said casing being preferably oblong and having a cover 8 extending thereover. Portions of the side and end walls of the casing are preferably formed of strips of glass 9 and 10, respectively, to provide visual spaces through which a view may be had of the interior of the casing.

Extending transversely through the side walls of the casing 7 and adjacent each end thereof are shafts 11 upon which are mounted sprockets 12, said sprockets being preferably arranged in pairs around which extend sprocket chains 13, a chain being positioned adjacent each wall of the casing, said side walls of the casing preferably having offset portions 14 for the reception of the sprocket wheels and chains.

Extending transversely of the casing is a plurality of uniformly spaced partition-like conveyer plates 15, said plates having wings 16 at each end thereof by means of which they are attached to flanges 17 of the links forming the chains 13, said wings being attached to the flanges in any suitable manner, as by means of rivets 18. The conveyer plates 15 are adapted to be moved longitudinally of the casing 7 and over a hot plate 19, said plate being secured in any suitable manner between the side walls of the casing 7 and is so located that the lower edges of the conveyer plates carried by the upper portion of the sprocket chains 13 will rest upon and drag over the upper surface of the hot plate so that peanuts or other products in the compartments or spaces between the conveyer plates, will be conveyed from end to end of the hot plate. The product is introduced into the compartments or spaces between the conveyer plates at one end of the hot plate and is carried to the opposite end of the hot plate and discharged onto the floor 20 of the casing 7, said product being then engaged and moved toward the opposite end of the casing by that portion of the conveyer plates carried by the lowermost portion of the sprocket chains 13.

The product is additionally heated as it passes over the floor 20 of the casing by introducing a secondary hot plate 21 below the floor 20, said floor 20 having a discharge opening 22 adjacent the end of the casing through which the product is introduced into the casing, thereby thoroughly treating or roasting the product as it passes through the casing from the time it is entered thereinto until it is discharged.

The hot plate 19 is more intensely heated than the secondary hot plate 21 and consequently the product traveling thereover is subject to a far greater heat and in order to prevent the product from becoming overheated or burnt while passing over the hot plate 19 and at the same time to agitate the product and cause the heated particles to move upwardly in the compartments between the conveyer plates above the hot plate 19, a pair of shafts 23 are extended transversely through the casing 7 and between the shafts 11, upon which is mounted a pair of sprocket wheels 24 of less diameter than the sprocket wheels 12, around which are extended sprocket chains 25 which are adapted to travel longitudinally of the casing between the upper and lower sections of the sprocket chains 13 and in unison therewith. Extending transversely of the casing 7 are agitator bars 26 which are substantially A-shaped, the ends of said bars having wings 27 by means of which they are attached to the links of the sprocket chains 25, said agitator bars being so arranged that there will be one bar positioned between each pair of the conveyer plates 15 which are positioned over the hot plate 19, serving to thoroughly agitate the product between the conveyer plates and cause the lowermost particles of the product to move upwardly, while the uppermost particles of the product move downwardly.

The product may be introduced into the casing 7 in any suitable manner, but I prefer to employ a pneumatic means for elevating the product, comprising a supply pipe 28 and an exhaust pipe 29, the upper ends of which terminate in a charging chamber 30 positioned above the casing 7 and adjacent one end thereof, said chamber being so constructed that a sufficient amount of the product will be contained therein to fill the compartments between each pair of the partition-like conveyer plates, but as said pipes and charging chamber form no part of this invention and are set forth and claimed in an application filed of even date herewith, it is not deemed necessary to further describe the same.

When the product is discharged from the charging chamber 30, it descends through a chute 31 into the interior of the casing 7, the movement of the sprocket chains 13 and the conveyer plates carried thereby being so timed as to longitudinal movement that the space between two conveyer plates will be under the chute when the product is discharged from the charging chamber.

The chains 13 and 25 are driven longitudinally of the casing 7 by attaching to one of the shafts 11 and 23 gears 32 and 33, respectively, the gear 32 being operated by a worm 34, while the gear 33 is operated by a worm 35. The worm 34 is mounted upon a shaft 36 and is rotatably mounted in the arms of a bracket 37 attached to the side wall of the casing 7, while the worm 35 is attached to a shaft 38 carried by sleeves 39 of a swinging bracket 40, said swinging bracket being pivotally mounted upon the shaft 23 between the gear 33 and wall of the casing 7.

The shafts 36 and 38 are made separate from each other, the shaft 38 causing the shaft 36 to rotate by attaching a head 41 to the shaft 36, said head having a line of notches 42 in the free end thereof with which engage a pin 43 carried by the shaft 38, the ends 44 of the heads 41 between the notches 42 having beveled edges so as to properly engage the pin 43 with the notches.

The shaft 38 is rotated through the medium of a ratchet wheel 45 which is fixed to the shaft 38 and so positioned that it will engage a pawl 46 pivotally mounted in a bracket 47 carried by the wall of the casing 7. The pawl 46 in addition to being provided with a weight 48 for holding the same in the path of the ratchet wheel 45, has a spring member 49 pressing thereagainst, said spring member also being attached to the wall of the casing 7. By arranging the shafts carrying the worms in the manner shown, both of the gears 32 and 33 will be rotated simultaneously for moving the sprocket chains 13 and 25 in unison with each other. In order to maintain a uniform travel between the sprocket chains 13 and 25 so that the agitator bars will always be in proper position to move transversely through the space between the conveyer plates, the two shafts 36 and 37 are positively locked against rotation, while in separated position. To this end a projection 50 is extended upwardly from one of the arms of the bracket 37 through which is extended a locking bar 51, said bar being substantially T-shaped and resting in a horizontal plane, the short arm 52 of the locking bar being adapted to pass into engagement with the notched disk 53 fixed to the shaft 36 and when in engagement with any one of the notches of said disk, said shaft will be held against rotation. The opposite arm 54 of the locking bar is extended a distance beyond the end of the short arm and is adapted to abut against a shoulder 55 on the swinging bracket 40, said shoulder being so positioned that when the bracket is in its lowermost position, or as shown in Fig. 6, the locking bar 51 will be pushed lengthwise and the short arm moved out of engagement with the notched disk 53, thereby leaving the shaft 36 free to be rotated. The locking bar 51 is returned into locked engagement with the disk 53 when the swinging bracket 40 is swung upwardly, through the medium of a spring 56 which is placed around the elongated arm 54 between the projection 50 and a head 57 on the end of the arm 54, the movement of the locking bar 51 toward the swinging bracket being limited by a pin 58.

A notched disk 59, similar to the notched disk 53, is attached to the shaft 38 so that when said shaft is rotated through the medium of the ratchet wheel 45, the disk 59 will be rotated, and in order to hold the disk 59 and the shaft 38 against rotation, except when the shafts 37 and 38 are in operative relation with each other, a dog 60 is pivotally mounted upon the sleeve 39 carried by the swinging bracket 40, said dog being normally held in engagement with the notches of the disk 59 through the medium of a coiled spring 61.

The agitator bars 26 are moved transversely of the spaces between the conveyer plates 15 by rotating the gear 33 a predetermined distance back and forth, thereby moving the sprocket chain 25 lengthwise in each direction a sufficient distance to move the agitator bars from a point adjacent one conveying plate to a point adjacent the opposite conveyer plate, and then return the agitator bar to a point slightly in advance of its initial position. This result is accomplished by swinging the bracket 40 upwardly on its pivot, causing the same to travel in the arc of a circle around the shaft 23, this movement also carrying with the bracket 40 the worm 35, sleeve 39 and ratchet wheel 45, and as the dog 60 is in engagement with one of the notches of the disk 59 during the swinging movement of the bracket 40, the disk 59 will be held in fixed relation with the worm 35 during the entire swinging movement of the bracket. The position of the parts coöperating with the gear 33 while the bracket 40 is making its swinging movement, is shown in Fig. 9.

Power is applied to cause the bracket 40 to swing back and forth, from any suitable form of motor, not shown, which is connected to a belt wheel 62, said wheel being mounted in supporting brackets 63 positioned upon the partition wall 2. The shaft 64, upon which the wheel 62 is mounted, has a pinion 65 thereon with which meshes a gear 66 mounted upon a shaft 67, said shaft being in turn supported by brackets 68 likewise mounted upon the partition wall 2. Attached to one end of the shaft 67 is a crank 69, to the free end of which is attached a link rod 70, the opposite end of said rod being pivotally attached to the sleeve 39 so that as the shaft 67 is rotated, the bracket 40 and parts carried thereby, will be alternately raised and lowered. The dog 60 is also operated to release it from the disk 59 by pivotally attaching a rod 71 to an arm 72 carried by the link rod 70 and extending the upper end thereof through an extension 73 which is pivoted to an arm of the dog 60, said rod being so proportioned as to length that when the parts are in position shown in Fig. 6, the head 74, formed preferably by introducing nuts onto the upper end of the rod 71, strikes the upper face of the extension and swings the dog upwardly and out of the path of the disk 59, this action taking place just prior to the ratchet wheel 45 striking the pawl 46. As the parts operated by the rod 70 start on their upward movement, and while making their upward and downward movement, the rod 71 assumes the position shown in Fig. 9, said rod being moved upwardly through the extension 73 and releasing the head 74 from the extension, whereupon the spring 61 will move the dog 60 into engagement with one of the notches of the disk 59, thus holding said disk against rotation.

The hot plates 19 and 21 are preferably heated by electricity, a current being conveyed to said plates from any suitable source through wires 75, and for protection said wires are conducted through the cabinet through a pipe 76, said pipe having extensions 77 and 78 from which the wires are led, respectively, to the plate 21 and plate 19.

The chains 13 and 25 are retained substantially taut, by providing movable bearings 79 and 80 for the shafts 11 and 23, respectively, at one end of the casing 7, said movable bearings being mounted in slots 81 and 82 in the side walls of the casing 7 and adjusted longitudinally by means of bolts 83 and 84, respectively, said adjusting means compensating for expansion and contraction of the sprocket chains.

The charging chamber 30 is open at its lower edge and in order to hold the nuts or the like in the charging chamber until such time as one of the compartments has moved into registration below the chute 31, doors 85 and 86 are hinged along one of their edges to rods 87 and 88, respectively, which rods are supported below the charging chamber 30 upon a base 89. The door 86 is provided with an extension 90 which overlaps the edge of the door 85 so as to form a substantially air tight union between the doors, whereby when the doors are closed, the air will be drawn through the pipes 28 and 29.

Attached to one end of the rod 88 is a bell crank lever 91 to one arm of which is attached a link rod 92, the opposite end of said link rod being pivotally attached to a lever 93 fixed to the shaft 87. The bell crank lever 91 is rocked in order to swing the doors 85 and 86 to open position by attaching one end of a pitman 94 to the lowermost arm of the bell crank lever, the opposite end of the pitman being pivotally attached to one end of a bar 95, the opposite end of the bar being pivotally attached to the side of the casing 7.

The bar 95 is swung on its pivot to give a longitudinal pull upon the pitman 94 by attaching a disk 96 to one of the shafts 11, said disk having cam faces 97 thereon which engage a friction roller carried by an extension 98 on the bar 95. The roller carried by the extension 98 is held in frictional engagement with the edge of the disk 96 and the cam faces 97 by means of a spring 99, one end of which is fixed to the casing 7 and the opposite end extending below and engaging with the bar 95, said spring between its end being coiled around the bearing for the bar 95. As the shaft 11 rotates to move the partition plates 15 across the hot plate 19, the disk 96 will be likewise rotated, and by properly timing the cam faces with respect to the movement of said partition plates, the doors 85 and 86 will be swung to open position when the space between the partition plates is in registration below the chute 31, as shown in Fig. 2, the position of the doors in this figure being shown in open position by dotted lines. As soon as each cam face moves out of registration with the friction roller carried by the extension 98, the doors will be instantly closed when an additional charge of the nuts will be drawn into the charging chamber ready to be discharged into the next succeeding compartment or space between the next pair of partition plates.

In operation, when motion is imparted to the shaft 67 through the medium of the wheel 62 and gears 65 and 66, thus imparting motion intermittently to the worms 34 and 35 and the gears 32 and 33, and as rapidly as the compartments formed by the conveyer plates 15 are brought into registration below the chute 31, a charge of the product is deposited therein, the continued movement of the conveyer plates slowly dragging the product across the hot plate 19 until the opposite end thereof is reached, when the product will descend onto the bottom of the casing 7 and then be moved in the opposite direction to the discharging opening 22 by such of the conveyer plates as are carried by the lowermost portions of the sprocket chains. This latter movement of the product carries the same over the secondary hot plate 21, the two plates thoroughly roasting or treating the product during its passage thereover. During the travel of the product over the hot plate 19, the gear 33 will be swung back and forth in an arc of a circle, thereby moving the sprocket chains 25 back and forth longitudinally, causing the agitator bars 26, carried by said sprocket chains, to move from side to side of the compartments formed between such of the conveyer plates as are traveling over the hot plate 19, thus thoroughly agitating the product and in view of the shape of the agitating bars, causing the lower particles of the product to move upwardly and permitting the upper particles of the product to descend onto the hot plate.

The invention claimed is:

1. A machine for roasting peanuts or the like, including a horizontal stationary hot plate, a compartment conveyer along the upper surface of said hot plate, a feed chute with which the compartments of the conveyer successively register and means to intermittently open and close the lower end of the chute to control the discharge of the contents of the chute into the compartments.

2. A machine for roasting peanuts or the like, including a horizontal hot plate, a feed chute over one end of the hot plate, means for intermittently opening and closing the lower end of said chute to control the discharge of the contents of the chute, and a conveyer on said hot plate with vertical partitions forming conveyer chambers adapted to register successively with said feed chute.

3. A machine for roasting peanuts or the like, including a pair of hot plates, one below the other, an endless conveyer with vertical partitions adapted to travel over the surface of said plates, means for operating the same, a feed chute adapted to register periodically and successively with the sections of said endless conveyer, and a discharge outlet at substantially the inner end of the conveyer, means to intermittently discharge the contents of the chute, whereby the material will be treated successively by said hot plates.

4. A machine for roasting peanuts or the like, including a pair of horizontal hot plates, one above the other, a feed chute above one end of the upper hot plate, means for intermittently opening and closing the lower end of said chute to control the discharge of the contents of the chute, a discharge outlet near the corresponding end of the lower hot plate, and an endless conveyer for moving the material over said hot plates.

5. A machine for roasting peanuts or the like, including a pair of horizontal hot plates, one above the other, a feed chute above one end of the upper hot plate, means to intermittently discharge the contents of the chute, a discharge outlet near the corresponding end of the lower hot plate, an endless conveyer for moving the material over said hot plates, parts of the conveyer lying on the upper hot plate, and spaced away from the lower hot plate.

6. A machine for roasting peanuts or the like, including a horizontal stationary hot plate, a compartment conveyer movable along the top of said plate, and agitating means operable in each of said compartments.

7. A machine for roasting peanuts or the like, including a horizontal stationary hot plate, a compartment conveyer movable along the top of said plate, and forward and backward reciprocating means operating in each compartment.

8. A machine for roasting peanuts or the like, including a horizontal stationary hot plate, a compartment conveyer movable along the top of said plate, agitating means movable along said hot plate forward and backward in each compartment.

9. A machine for roasting peanuts or the like, including a horizontal hot plate, a conveyer traveling over the upper surface thereof and divided into successive compartments, and rearward and forward reciprocating means operable in each compartment over the surface of the hot plate.

10. A machine for roasting peanuts or the like, comprising a hot plate, endless chains traveling over said hot plate, vertical partition plates connected with said chains and traveling over said hot plate forming successive compartments, a parallel set of endless chains, and an agitator operated by said chains in each compartment.

11. A machine for roasting peanuts or the like, comprising a hot plate, endless chains traveling over said hot plate, vertical partition plates connected with said chains and traveling over said hot plate forming successive compartments, a parallel set of endless chains, an agitator in each compartment operated by said last chains, and means giving a forward and backward movement of the chains carrying said agitators.

12. A machine for roasting peanuts or the like comprising a hot plate, endless chains traveling over said hot plate, vertical partition plates connected with said chains and traveling over said hot plate forming successive compartments, a parallel set of endless chains, an agitator in each compartment, A-shaped in cross section operated by said chains, and means giving a forward and backward movement of the chains carrying said agitators.

13. A machine for roasting peanuts or the like, including a horizontal hot plate, an endless conveyer with successive compartments adapted to travel over said hot plate, a feed chute with which each compartment of the conveyer is adapted to register, means for intermittently opening and closing the lower end of the chute for regulating the discharge of the contents of the chute, and means for operating said conveyer so that each compartment will be temporarily positioned under the feed chute while it obtains its charge.

14. A machine for roasting peanuts or the like, including a horizontal hot plate, an endless conveyer with partition plates forming compartments movable along said hot plate, means for causing the operation thereof, a feed chamber over said conveyer with the bottom adapted to be opened, and means for opening the bottom of said feed chamber, for charging a compartment of the conveyer.

15. A machine for roasting peanuts or the like, including a horizontal hot plate, an endless conveyer with partition plates forming compartments movable along said hot plate, means for causing the operation thereof, a feed chamber over said conveyer with the bottom adapted to be opened, means for opening the bottom of said feed chamber for charging a compartment of the conveyer, and a feed chute located between said chamber and the conveyer for guiding the charge to the proper compartment.

16. A machine for roasting peanuts or the like, including a horizontal hot plate, an endless conveyer with partition plates forming compartments movable along said hot plate, means for causing the operation thereof, a feed chamber over said conveyer having a bottom formed of two oppositely hinged halves adapted to open downward and away from each other, and means for opening the bottom members of said feed chamber for charging a compartment of the conveyer.

17. A machine for roasting peanuts or the like, including a horizontal hot plate, an endless conveyer with partition plates forming compartments movable along said hot plate, means for causing the operation thereof, a feed chamber over said conveyer having a bottom formed of two oppositely hinged halves adapted to open downward and away from each other, means for opening the bottom members of said feed chamber for charging a compartment of the conveyer, and a chute between the conveyer and said chamber with which the bottom plates of the chamber register when in open position so as to form lateral connections between the chamber and the chute.

18. A machine for roasting peanuts or the like, including endless chains arranged in pairs, one pair of said chains having partition forming plates and the other pair of chains having agitating bars, one between each pair of partition plates, a gear for operating each pair of chains, means for simultaneously rotating said gears for moving said chains in unison in one direction, means for locking said gears against rotation with respect to longitudinal movement of both sets of chains, and means for swinging the rotating mechanism for the bar operating gear, whereby said bars will be moved laterally between said partition plates.

19. A machine for roasting peanuts or the like, including an endless conveyer having partition plates forming compartments, a plurality of agitating bars adapted to move in unison, a gear for moving the conveyer longitudinally, a second gear for moving the plurality of bars longitudinally, a worm for each gear, means to impart rotation to said worms whereby the gears and parts operated thereby will move in unison, means for locking said worms against rotation, and means for swinging one of the worms in an arc of a circle when in locked position, whereby the agitator bars between the pairs of partition plates will be moved back and forth between said plates.

20. A machine for roasting peanuts or the like, including a hot plate, a pair of endless chains passing above and below the hot plate, a plurality of partition plates carried by said chains and spaced apart to form compartments, a second pair of endless chains also movable above and below the hot plate, a plurality of agitating bars carried by the second pair of chains, a gear for operating each chain, an operating worm for each gear, a two-part shaft carrying said worms, means for causing one shaft to rotate with the other, and means for imparting movement to said shafts.

21. A machine for roasting peanuts or the like, including an endless conveyer and a plurality of agitator bars, a gear for operating the endless conveyer, a similar gear for operating the agitator bars, a worm for each gear, a shaft rotatably mounted in fixed bearings for supporting the conveyer operating worm, a second shaft mounted in movable bearings for supporting the worm coöperating with the agitator bars, means for intermittently rotating the shaft carried by the movable bearings, and means for causing the shaft mounted in the fixed bearings to rotate simultaneously with the shaft mounted in the movable bearings.

22. A machine for roasting peanuts or the like, including an endless conveyer, a plurality of agitator bars, gears for operating said conveyer and agitating bars, an operating worm for each gear, a shaft for each worm, stationary bearings for the shaft carrying the conveyer operating worm, a swinging bearing for the shaft carrying the agitator operating worm, means for causing both of said shafts to rotate in unison, means for swinging the agitator operating worm and its shaft in an arc of a circle, a locking device for each shaft, means for releasing the locking mechanism for the conveyer operating worm by the movement of the swinging bearing for the other worm, means controlled by the movement of the agitator operating worm for releasing the locking mechanism for said latter worm, and means for imparting rotation to said shafts.

23. A machine for roasting peanuts or the like, including an endless conveyer and an endless agitating means, an operating worm and gear for said endless conveyer and a similar worm and gear for the agitating means, a separate shaft carrying each worm, means for causing said shafts to rotate in unison, means for swinging the shaft and worm employed for operating the agitating mechanism, a locking device controlled by the swinging movement of the parts supporting the operating worm for the agitator means for locking and unlocking the shaft carrying the conveyer operating worm, means for swinging the worm and shaft of the agitator means in an arc of a circle, a device for locking said latter shaft and worm against rotation, and means operated by the movement of the element for swinging said latter shaft for disengaging the locking mechanism for said shaft.

24. A machine for roasting peanuts or the like, including an endless conveyer, agitating means coöperating therewith, gears for operating said conveyer and agitating means, worms for operating said gears, means for locking said worms against independent rotation of the gears, and means for releasing said locking mechanism at predetermined intervals.

In witness whereof, I have hereunto affixed my signature.

CHARLES A. TRIPP.

Copies of this patent may be obtained for five cents each, by addressing the "Commissioner of Patents, Washington, D. C."